(12) United States Patent  
Ohki (10) Patent No.: US 9,150,149 B2  
(45) Date of Patent: Oct. 6, 2015

(54) DIRECTION INDICATING APPARATUS

(75) Inventor: Isao Ohki, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 14/346,639

(22) PCT Filed: Aug. 6, 2012

(86) PCT No.: PCT/JP2012/069991  
§ 371 (c)(1),  
(2), (4) Date: Mar. 21, 2014

(87) PCT Pub. No.: WO2014/024245  
PCT Pub. Date: Feb. 13, 2014

(65) Prior Publication Data  
US 2014/0232285 A1    Aug. 21, 2014

(51) Int. Cl.  
H05B 37/02 (2006.01)  
B60Q 1/38 (2006.01)  
B60Q 11/00 (2006.01)  
H05B 33/08 (2006.01)

(52) U.S. Cl.  
CPC ................ B60Q 1/38 (2013.01); B60Q 11/007 (2013.01); H05B 33/0809 (2013.01)

(58) Field of Classification Search  
CPC .... H05B 37/029; H05B 33/0803; G09F 9/33; B60Q 1/387  
USPC ......... 315/201, 185, 200, 193, 224, 149, 210, 315/185 R, 291; 340/475, 815.45, 476  
See application file for complete search history.

(56) References Cited

U.S. PATENT DOCUMENTS

| | | | |
|---|---|---|---|
| 5,790,017 A * | 8/1998 | Berryhill | 340/475 |
| 7,005,978 B2 * | 2/2006 | Takeuchi et al. | 340/475 |
| 7,026,768 B1 * | 4/2006 | Ruiz | 315/185 R |
| 2002/0047531 A1 * | 4/2002 | Sugimoto et al. | 315/82 |
| 2003/0226954 A1 * | 12/2003 | Ohmi | 250/221 |
| 2004/0095234 A1 * | 5/2004 | Sugimoto et al. | 340/475 |
| 2005/0073428 A1 * | 4/2005 | Sugimoto et al. | 340/815.45 |
| 2006/0091817 A1 * | 5/2006 | Herrig et al. | 315/200 A |

(Continued)

FOREIGN PATENT DOCUMENTS

| | | |
|---|---|---|
| JP | S59-18043 U | 2/1984 |
| JP | S61-133435 U | 8/1986 |

(Continued)

OTHER PUBLICATIONS

International Search Report for PCT/JP2012/069991, mailed on Nov. 6, 2012, and its English translation.

(Continued)

*Primary Examiner* — Douglas W Owens  
*Assistant Examiner* — Syed M Kaiser  
(74) *Attorney, Agent, or Firm* — Ladas & Parry, LLP (57) ABSTRACT

To provide a direction indicating apparatus that does not detect a break occurring in an indicator but can detect a break occurring in a direction indicating lamp incorporating an LED element with reliability. The direction indicating apparatus includes a pulse signal generating part, a first switching element, a direction indicating switch, first and second direction indicating lamp units, a break detecting part, a lighting state detecting part, an indicator part and an indicator driving part.

7 Claims, 4 Drawing Sheets

(56) References Cited

U.S. PATENT DOCUMENTS

| | | | |
|---|---|---|---|
| 2007/0096893 A1* | 5/2007 | Kondo | 340/471 |
| 2007/0194905 A1* | 8/2007 | Herrig et al. | 340/471 |
| 2007/0273495 A1* | 11/2007 | Kesterson | 340/469 |
| 2008/0061956 A1* | 3/2008 | Takeuchi | 340/476 |
| 2008/0150708 A1* | 6/2008 | Takeuchi et al. | 340/426.1 |
| 2009/0184662 A1* | 7/2009 | Given et al. | 315/294 |
| 2009/0195183 A1* | 8/2009 | Yang | 315/294 |
| 2009/0273290 A1* | 11/2009 | Ziegenfuss | 315/193 |
| 2010/0045187 A1* | 2/2010 | Shteynberg et al. | 315/149 |
| 2010/0201283 A1* | 8/2010 | Kawata et al. | 315/287 |
| 2010/0220049 A1* | 9/2010 | Murakami | 345/102 |
| 2011/0169418 A1* | 7/2011 | Yang et al. | 315/291 |
| 2011/0187276 A1* | 8/2011 | Shteynberg et al. | 315/186 |
| 2012/0001546 A1* | 1/2012 | Takeuchi et al. | 315/77 |
| 2013/0147377 A1* | 6/2013 | Kubota et al. | 315/201 |
| 2013/0300297 A1* | 11/2013 | Shteynberg et al. | 315/151 |
| 2013/0307411 A1 | 11/2013 | Tsuchiya | 315/66 |
| 2014/0015409 A1* | 1/2014 | Tetsuka et al. | 315/77 |
| 2014/0016336 A1* | 1/2014 | Takenaka et al. | 362/473 |
| 2014/0049973 A1* | 2/2014 | Adachi et al. | 362/465 |

FOREIGN PATENT DOCUMENTS

| | | | | |
|---|---|---|---|---|
| JP | S64-90831 A | | 4/1989 | |
| JP | 2000-264127 | | 9/2000 | |
| JP | 2004-009826 | | 1/2004 | |
| JP | 2011-030821 | * | 2/2011 | 315/77 |
| JP | WO 2012/111574 | * | 8/2012 | B60Q 11/00 |
| WO | 2012/111574 A1 | | 8/2012 | |

OTHER PUBLICATIONS

International Preliminary Report on Patentability (IPRP) (Chapter I) dated Feb. 19, 2015 for PCT Patent Application No. PCT/JP2012/069991 and its English translation provided by WIPO.

* cited by examiner

DIRECTION INDICATING APPARATUS

CROSS-REFERENCE TO RELATED APPLICATION

This application is the national stage of International Patent Application no. PCT/JP2012/069991, filed on Aug. 6, 2012, the disclosure of which is incorporated herein in its entirety.

TECHNICAL FIELD

The present invention relates to a direction indicating apparatus that uses an LED element as a direction indicating lamp.

BACKGROUND ART

Figure 4:
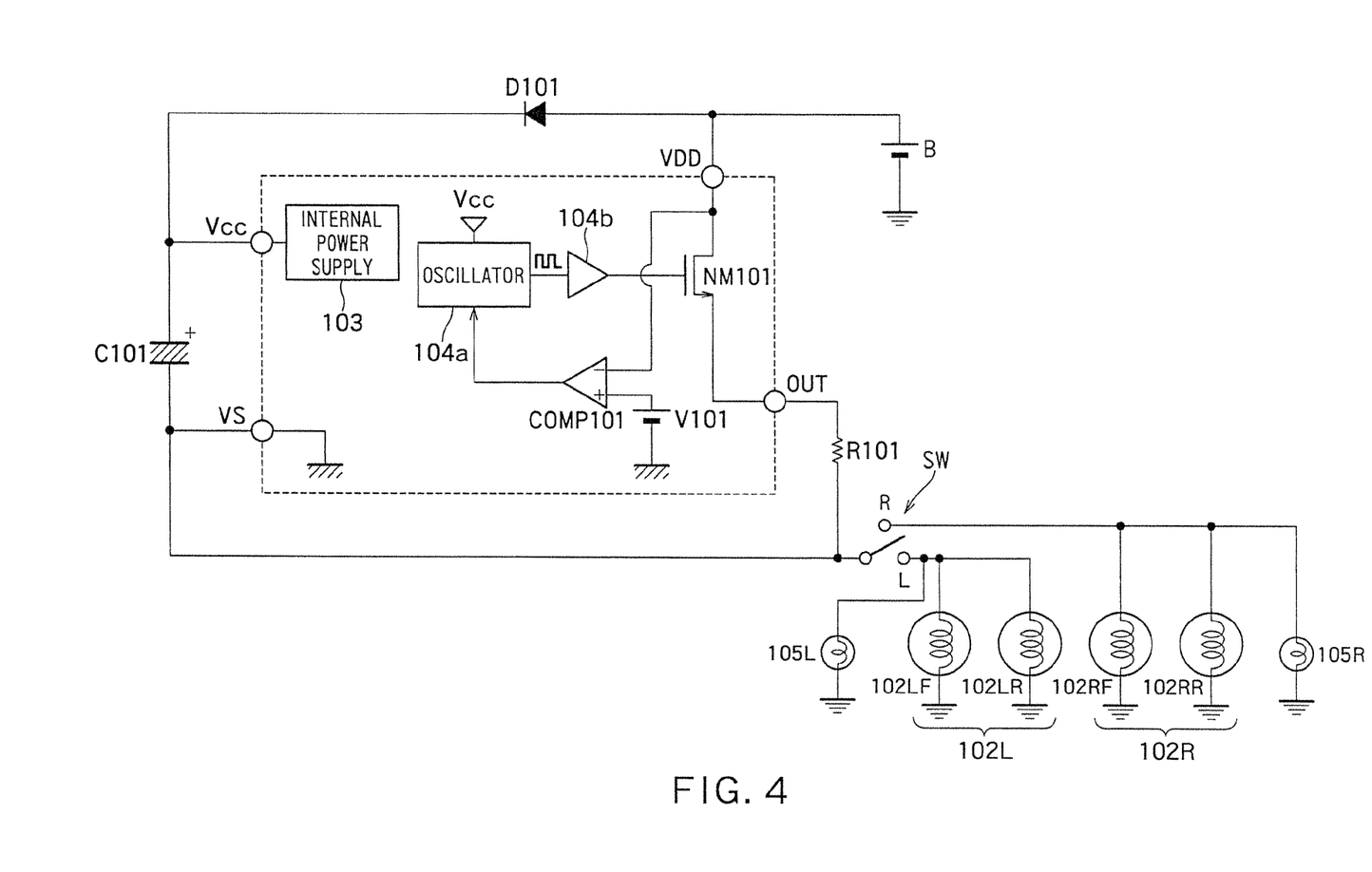
FIG. 4 shows an example of known direction indicating apparatuses for automobiles or motorcycles.

FIG. 4 shows an example of known direction indicating apparatuses for automobiles or motorcycles. The direction indicating apparatus incorporates electric bulbs serving as direction indicating lamp units (blinkers) "102L" and "102R". The direction indicating apparatus further includes indicators "105L" and "105R", which are provided in an instrument panel.

For example, if a direction indicating switch "SW" is turned on to an L terminal, a driving current flows through two electric bulbs "102LF" and "102LR" of the direction indicating lamp unit "102L" and the indicator "105L". As a result, the direction indicating lamp unit "102L" and the indicator "105L" blink with a period of an oscillation pulse signal supplied to a gate of an N-type MOS transistor "NM101". If a break occurs in either of the two electric bulbs "102LF" and "102LR" of the direction indicating lamp unit "102L", the driving current decreases. A comparator "COMP101" detects the decrease of the driving current and controls an oscillator "104a" to change the period of the oscillation pulse signal to approximately half. The direction indicating lamp unit "102L" and the indicator "105L" then blink at a rate approximately twice as high as before and thus can inform the driver of the break of the electric bulb "102LF" or "102LR".

The direction indicating electric bulbs "102LF", "102LR", "102RF" and "102RR" are electric bulbs of 10 W to 27 W, for example. In the case of the electric bulbs of 10 W, if the power supply voltage is 13.5V, a current of approximately 0.74 A flows. In the case of the electric bulbs of 27 W, if the power supply voltage is 13.5V, a current of approximately 2.2 A flows. The indicators "105L" and "105R" are electric bulbs of 1.2 W to 3.4 W or LED elements of 0.02 A to 0.1 A, for example. In the case of the electric bulbs of 1.2 W, if the power supply voltage is 13.5V, a current of approximately 0.09 A flows. In the case of the electric bulbs of 3.4 W, if the power supply voltage is 13.5V, a current of approximately 0.24 A flows.

Therefore, the amount of the decrease of the driving current relatively significantly differs between when a break occurs in the direction indicating lamp unit "102L" or "102R" and when a break occurs in the indicator "105L" or "105R". Thus, a voltage "V101" supplied to a comparator "COMP101" is set so that a break occurring in the indicator "105L" or "105R" is not detected but a break occurring in the direction indicating lamp unit "102L" or "102R" is detected.

In JP1-90831A, a known direction indicating apparatus similar to the direction indicating apparatus described above is described.

To improve the design of the body or to reduce the power consumption of the electronics, LED elements are desirably used instead of electric bulbs as direction indicating lamps of the direction indicating apparatus. However, the current flowing through the LED elements used for direction indication is approximately 0.1 A to 0.3 A, for example, and the difference between this current and the current flowing through the electric bulbs or LED elements in the indicators is less significant than the difference in the case where electric bulbs are used for direction indication.

Therefore, simply replacing the electric bulbs in the direction indicating lamps with LED elements in the arrangement of the conventional direction indicating apparatus described above is not enough to ensure that only a break in the direction indicating lamps is detected, because the amount of the decrease of the driving current does not significantly differ between when a break occurs in a direction indicating lamp and when a break occurs in an indicator. That is, when a break occurs in an indicator, the break is detected, and the rate of blinking of the direction indicating lamps increases to about twofold.

DISCLOSURE OF THE INVENTION

An object of the present invention is to provide a direction indicating apparatus that does not detect a break occurring in an indicator but can detect a break occurring in a direction indicating lamp incorporating an LED element with reliability.

A direction indicating apparatus, according to an embodiment of an aspect of the present invention, comprising:

a pulse signal generating part that generates a pulse signal;

a first switching element having a first end to which a power supply voltage is supplied, a control terminal to which the pulse signal is supplied and a second end at which a driving current having a magnitude corresponding to an amplitude of the pulse signal is output;

a direction indicating switch that has a first terminal, a second terminal and a third terminal and is capable of switching among a state where the first terminal and the second terminal are electrically connected to each other, a state where the first terminal and the third terminal are electrically connected to each other and a state where the first terminal, the second terminal and the third terminal are electrically disconnected from each other, the first terminal being connected to the second end of the first switching element;

a first direction indicating lamp unit that includes a first LED element, is connected to the second terminal at a first end thereof and to a ground at a second end thereof, and lights up when a current flows therethrough;

a second direction indicating lamp unit that includes a second LED element, is connected to the third terminal at a first end thereof and to the ground at a second end thereof, and lights up when a current flows therethrough;

a break detecting part that makes the pulse signal generating part change a period of the pulse signal when the driving current corresponding to a pulse wave of the pulse signal is equal to or lower than a predetermined break detection value;

a lighting state detecting part that detects a lighting state of the first direction indicating lamp unit and the second direction indicating lamp unit;

an indicator part having one or a plurality of indicators that light up when a current flows therethrough; and an indicator driving part that drives the one indicator and makes the one indicator light up in response to the lighting state detected by the lighting state detecting part or drives at least any of the plurality of indicators and makes the indicator light up in response to the lighting state.

In the direction indicating apparatus, the indicator part has a first indicator and a second indicator, and the indicator driving part drives the first indicator and makes the first indicator light up in a first light-up period in which the first direction indicating lamp unit lights up and does not drive the first indicator and does not make the first indicator light up in a first light-off period in which the first direction indicating lamp unit does not light up, and the indicator driving part drives the second indicator and makes the second indicator light up in a second light-up period in which the second direction indicating lamp unit lights up and does not drive the second indicator and does not make the second indicator light up in a second light-off period in which the second direction indicating lamp unit does not light up.

In the direction indicating apparatus, the lighting state detecting part detects that the first direction indicating lamp unit lights up if a voltage at the first end of the first direction indicating lamp unit is equal to or higher than a predetermined first threshold voltage and detects that the first direction indicating lamp unit does not light up if the voltage at the first end of the first direction indicating lamp unit is lower than the first threshold voltage, and the lighting state detecting part detects that the second direction indicating lamp unit lights up if a voltage at the first end of the second direction indicating lamp unit is equal to or higher than a predetermined second threshold voltage and detects that the second direction indicating lamp unit does not light up if the voltage at the first end of the second direction indicating lamp unit is lower than the second threshold voltage.

In the direction indicating apparatus, the indicator driving part has:

a second switching element having a first end to which the power supply voltage is supplied and a second end at which a first indicator driving current is output in the first light-up period and is not output in the first light-off period; and a third switching element having a first end to which the power supply voltage is supplied and a second end at which a second indicator driving current is output in the second light-up period and is not output in the second light-off period, the first indicator is connected to the second end of the second switching element at a first end thereof and to the ground at a second end thereof, and the second indicator is connected to the second end of the third switching element at a first end thereof and to the ground at a second end thereof.

In the direction indicating apparatus, the second switching element is formed by a first P-type MOS transistor having a source to which the power supply voltage is supplied and a drain connected to the first end of the first indicator, the third switching element is formed by a second P-type MOS transistor having a source to which the power supply voltage is supplied and a drain connected to the first end of the second indicator, and the lighting state detecting part has:

a first resistor that receives the power supply voltage at a first end thereof and is connected to a gate of the first P-type MOS transistor at a second end thereof;

a second resistor that receives the power supply voltage at a first end thereof and is connected to a gate of the second P-type MOS transistor at a second end thereof;

a fourth switching element that has a first end connected to the second end of the first resistor, a control terminal connected to the first end of the first direction indicating lamp unit and a second end connected to the ground and is turned on when the voltage at the first end of the first direction indicating lamp unit is equal to or higher than the first threshold voltage; and a fifth switching element that has a first end connected to the second end of the second resistor, a control terminal connected to the first end of the second direction indicating lamp unit and a second end connected to the ground and is turned on when the voltage at the first end of the second direction indicating lamp unit is equal to or higher than the second threshold voltage.

In the direction indicating apparatus, the indicator part has the one indicator, and the indicator driving part drives the one indicator and makes the one indicator light up in a light-up period in which either of the first direction indicating lamp unit and the second direction indicating lamp unit lights up, and does not drive the one indicator and does not make the one indicator light up in a light-off period in which both the first direction indicating lamp unit and the second direction indicating lamp unit do not light up.

In the direction indicating apparatus, the lighting state detecting part detects that either of the first direction indicating lamp unit and the second direction indicating lamp unit lights up if a voltage at the first terminal of the first direction indicating switch is equal to or higher than a predetermined threshold voltage and detects that both the first direction indicating lamp unit and the second direction indicating lamp unit do not light up if the voltage at the first terminal of the direction indicating switch is lower than the threshold voltage.

In the direction indicating apparatus, the indicator driving part has a second switching element having a first end to which the power supply voltage is supplied and a second end at which an indicator driving current is output in the light-up period and is not output in the light-off period, and the one indicator is connected to the second end of the second switching element at one end thereof and to the ground at a second end thereof.

In the direction indicating apparatus, the second switching element is formed by a P-type MOS transistor having a source to which the power supply voltage is supplied and a drain connected to the first end of the one indicator, and the lighting state detecting part has:

a resistor that receives the power supply voltage at a first end thereof and is connected to a gate of the P-type MOS transistor at a second end thereof; and a third switching element that has a first end connected to the second end of the resistor, a control terminal connected to the first terminal of the direction indicating switch and a second end connected to the ground and is turned on when the voltage at the first terminal of the direction indicating switch is equal to or higher than the threshold voltage.

According to the present invention, in addition to the first switching element that outputs the driving current to the first or second direction indicating lamp unit, the indicator driving part is provided that drives one indicator of the indicator part and makes the one indicator light up in response to the lighting states of the first and second direction indicating lamp units or drives at least any of a plurality of indicators of the indicator part and makes the indicator light up in response to the lighting states of the first and second direction indicating lamp units. Therefore, the current path to the indicator part is different from the path of the driving current flowing to the first or second direction indicating lamp unit. As a result, even if a break occurs in an indicator, the decrease of the current flowing to the indicator part does not affect the driving current, so that the break detecting part can be prevented from detecting the break. In this way, a break occurring in a direction indicating lamp incorporating an LED element can be detected with reliability by avoiding detecting a break occurring in an indicator.

BEST MODE FOR CARRYING OUT THE INVENTION

In the following, embodiments of the present invention will be described with reference to the drawings.
(First Embodiment)

Figure 1:
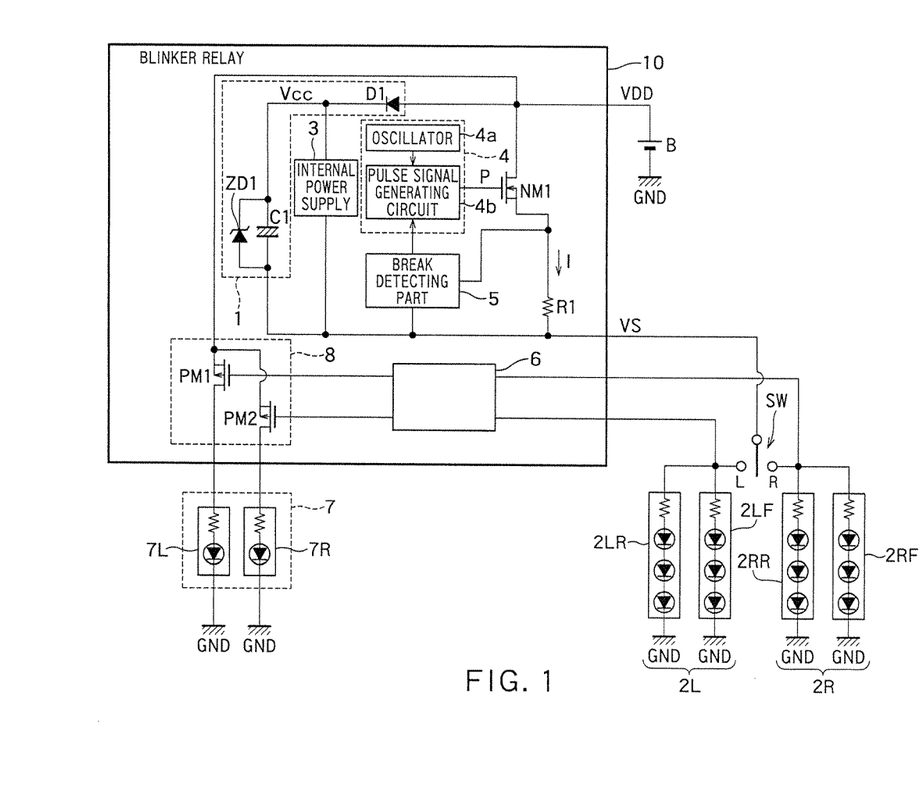
FIG. 1 is a circuit diagram showing a direction indicating apparatus according to a first embodiment of the present invention.

FIG. 1 is a circuit diagram showing a direction indicating apparatus according to a first embodiment of the present invention. As shown in FIG. 1, the direction indicating apparatus includes a bootstrap circuit 1, a direction indicating switch "SW", a first direction indicating lamp unit "2L", a second direction indicating lamp unit "2R", an internal power supply 3, a pulse signal generating part 4, an N-type MOS transistor (a first switching element) "NM1", a current detecting resistor "R1", a break detecting part 5, a lighting state detecting part 6, an indicator part 7 and an indicator driving part 8. The direction indicating apparatus is used in a motorcycle, for example.

The bootstrap circuit 1, the internal power supply 3, the pulse signal generating part 4, the N-type MOS transistor "NM1", the current detecting resistor "R1", the break detecting part 5, the lighting state detecting part 6 and the indicator driving part 8 form a blinker relay (a direction indicating lamp controlling device) 10.

The bootstrap circuit 1 has a diode (a rectifying element) "D1", a capacitive element "C1" and a Zener diode "ZD1". A power supply voltage "VDD" from a power supply (a battery) "B" is applied to an anode (one end) of the diode "D1". The capacitive element "C1" is connected to a cathode (another end) of the diode "D1" at one end thereof and to a first terminal of the direction indicating switch "SW" at another end thereof. The Zener diode "ZD1" is connected to the one end of the capacitive element "C1" at a cathode thereof and to the another end of the capacitive element "C1" at an anode thereof.

The direction indicating switch "SW" has the first terminal, a second terminal (an L terminal) and a third terminal (an R terminal). The direction indicating switch "SW" can switch among a state where the first terminal and the second terminal are electrically connected to each other, a state where the first terminal and the third terminal are electrically connected to each other and a state where the first terminal, the second terminal and the third terminal are electrically disconnected from each other.

The first direction indicating lamp unit "2L", which is on the left side, is connected to the second terminal of the direction indicating switch "SW" at one end (on an anode side) thereof and to a ground at another end (on a cathode side) thereof, and lights up when a current flows therethrough.

The second direction indicating lamp unit "2R", which is on the right side, is connected to the third terminal of the direction indicating switch "SW" at one end (on an anode side) thereof and to the ground at another end (on a cathode side) thereof, and lights up when a current flows therethrough.

The first direction indicating lamp unit "2L" has a front left direction indicating lamp "2LF" and a rear left direction indicating lamp "2LR" connected in parallel with each other. The front left direction indicating lamp "2LF" and the rear left direction indicating lamp "2LR" each include three first LED elements and a current limiting resistor connected in series with each other.

The second direction indicating lamp unit "2R" has a front right direction indicating lamp "2RF" and a rear right direction indicating lamp "2RR" connected in parallel with each other. The front right direction indicating lamp "2RF" and the rear right direction indicating lamp "2RR" each include three second LED elements and a current limiting resistor connected in series with each other.

With such a configuration, if the direction indicating switch "SW" is turned on to the second terminal or third terminal, a current from the power supply "B" flows to a ground "GND" through the diode "D1", the capacitive element "C1", the direction indicating switch "SW", and the first direction indicating lamp unit "2L" or the second direction indicating lamp unit "2R". As a result, the capacitive element "C1" is charged, and the bootstrap circuit 1 generates an internal power supply voltage "Vcc", which is a voltage at the one end of the capacitive element "C1", based on a reference voltage "VS", which is a voltage at the another end of the capacitive element "C1". Even if the reference voltage "VS" changes, the value of the internal power supply voltage "Vcc" minus the reference voltage "VS", which is the voltage across the capacitive element "C1", is kept substantially constant. The Zener diode "ZD1" limits the voltage across the capacitive element "C1" to be equal to or lower than a Zener voltage.

The internal power supply 3 is activated by the potential difference between the internal power supply voltage "Vcc" and the reference voltage "VS" as a power supply and generates a bias voltage with reference to the reference voltage "VS". Although not shown, the generated bias voltage is supplied to a predetermined circuit in the blinker relay 10. The bias voltage is a voltage that is used to determine an operating point or the like in a circuit and is supplied to a circuit in need of the bias voltage in addition to the internal power supply voltage "Vcc".

The pulse signal generating part 4 is activated by the potential difference between the internal power supply voltage "Vcc" and the reference voltage "VS" as a power supply and generates a pulse signal "P" at a predetermined frequency (1.42 Hz, for example). For example, the pulse signal "P" is a rectangular wave signal and has a duty ratio of approximately 50%. Specifically, the pulse signal generating part 4 has an oscillator "4a" and a pulse signal generating circuit "4b".

The oscillator "4a" generates an oscillation signal. The pulse signal generating circuit "4b" amplifies the oscillation signal from the oscillator "4a" and divides the frequency of the signal, thereby generating the pulse signal "P". The pulse signal "P" can have an amplitude ranging from the reference voltage "VS" to the internal power supply voltage "Vcc".

The N-type MOS transistor "NM1" has a drain (one end) to which the power supply voltage "VDD" is supplied, a gate to which the pulse signal "P" is supplied, and a source (another end) at which a driving current "I" having a magnitude corresponding to the amplitude of the pulse signal "P" is output.

The current detecting resistor "R1" is connected between the source of the N-type MOS transistor "NM1" and the first terminal of the direction indicating switch "SW". In other words, the source of the N-type MOS transistor "NM1" is connected to the first terminal of the direction indicating switch "SW" via the current detecting resistor "R1".

With such a configuration, the driving current "I" having a magnitude corresponding to the amplitude of the pulse signal "P" flows to the first direction indicating lamp unit "2L" or the second direction indicating lamp unit "2R" via the direction indicating switch "SW". As a result, the first direction indicating lamp unit "2L" or the second direction indicating lamp unit "2R" blinks at the frequency of the pulse signal "P".

The break detecting part 5 makes the pulse signal generating part 4 change the period (that is, the frequency) of the pulse signal "P" if the driving current "I" corresponding to a pulse wave of the pulse signal "P" becomes equal to or lower than a predetermined break detection value, that is, if the break detecting part 5 detects a break. The break detection value can be set at a value based on which it is possible to detect that a break occurs in either of the front left direction indicating lamp "2LF" and the rear left direction indicating lamp "2LR" and that a break occurs in either of the front right direction indicating lamp "2RF" and the rear right direction indicating lamp "2RR".

If the break detecting part 5 detects a break, the pulse signal generating part 4 can increase the frequency of the pulse signal "P" to 2.84 Hz, which is twice as high as before, for example, or decrease the frequency. Specifically, the pulse signal generating circuit "4b" in the pulse signal generating part 4 can change the frequency division ratio to change the frequency of the pulse signal "P". As a result, if a break occurs in the front left direction indicating lamp "2LF" or the rear left direction indicating lamp "2LR", and the direction indicating switch "SW" is turned on to the second terminal, the direction indicating lamp in which no break occurs blinks at a frequency different from that before occurrence of the break. Similarly, if a break occurs in the front right direction indicating lamp "2RF" or the rear right direction indicating lamp "2RR", and the direction indicating switch "SW" is turned on to the third terminal, the direction indicating lamp in which no break occurs blinks at a frequency different from that before occurrence of the break. In this way, the driver can be informed that a break has occurred in one of the first direction indicating lamp unit "2L" or the second direction indicating lamp unit "2R".

The break detecting part 5 determines whether the driving current "I" corresponding to the pulse wave of the pulse signal "P" becomes equal to or lower than the break detection value based on the voltage across the current detecting resistor "R1" by using a comparator, for example.

The lighting state detecting part 6 detects lighting states of the first direction indicating lamp unit "2L" and the second direction indicating lamp unit "2R". Specifically, the lighting state detecting part 6 detects that the first direction indicating lamp unit "2L" lights up if the voltage at the one end of the first direction indicating lamp unit "2L" is equal to or higher than a predetermined first threshold voltage, and detects that the first direction indicating lamp unit "2L" does not light up if the voltage at the one end of the first direction indicating lamp unit "2L" is lower than the first threshold voltage.

Furthermore, the lighting state detecting part 6 detects that the second direction indicating lamp unit "2R" lights up if the voltage at the one end of the second direction indicating lamp unit "2R" is equal to or higher than a predetermined second threshold voltage, and detects that the second direction indicating lamp unit "2R" does not light up if the voltage at the one end of the second direction indicating lamp unit "2R" is lower than the second threshold voltage.

In a case where the first direction indicating lamp unit "2L" and the second direction indicating lamp unit "2R" have substantially the same electrical characteristics, the first threshold voltage and the second threshold voltage can be equal to each other.

The indicator part 7 has a first indicator "7L" on the left side and a second indicator "7R" on the right side. The first indicator "7L" and the second indicator "7R" can be provided in an instrument panel of a motorcycle.

The first indicator "7L" and the second indicator "7R" each have an LED element and a current limiting resistor connected in series with each other and light up when a current flows therethrough.

In response to the lighting state detected by the lighting state detecting part 6, the indicator driving part 8 drives at least one of the first indicator "7L" and the second indicator "7R" and makes the indicator light up.

Specifically, under the control of the lighting state detecting part 6, the indicator driving part 8 drives the first indicator "7L" and makes the first indicator "7L" light up in a first light-up period in which the first direction indicating lamp unit "2L" lights up, and does not drive the first indicator "7L" and does not make the first indicator "7L" light up in a first light-off period in which the first direction indicating lamp unit "2L" does not light up.

Furthermore, under the control of the lighting state detecting part 6, the indicator driving part 8 drives the second indicator "7R" and makes the second indicator "7R" light up in a second light-up period in which the second direction indicating lamp unit "2R" lights up, and does not drive the second indicator "7R" and does not make the second indicator "7R" light up in a second light-off period in which the second direction indicating lamp unit "2R" does not light up.

In this embodiment, the indicator driving part 8 has a first P-type MOS transistor (a second switching element) "PM1" and a second P-type MOS transistor (a third switching element) "PM2".

The first P-type MOS transistor "PM1" has a source (one end) to which the power supply voltage "VDD" is supplied and a drain (another end) at which a first indicator driving current is output in the first light-up period and the first indicator driving current is not output in the first light-off period.

The second P-type MOS transistor "PM2" has a source (one end) to which the power supply voltage "VDD" is supplied and a drain (another end) at which a second indicator driving current is output in the second light-up period and the second indicator driving current is not output in the second light-off period.

The first indicator "7L" is connected to the drain of the first P-type MOS transistor "PM1" at one end (on an anode side) thereof and to the ground "GND" at another end (on a cathode side) thereof. That is, the first indicator driving current can flow to the first indicator "7L".

The second indicator "7R" is connected to the drain of the second P-type MOS transistor "PM2" at one end (on an anode side) thereof and to the ground "GND" at another end (on a cathode side) thereof. That is, the second indicator driving current can flow to the second indicator "7R".

The lighting state detecting part 6 can have any circuit configuration that serves the functions described above. An example of such a circuit configuration will be described below with reference to FIG. 2.

Figure 2:
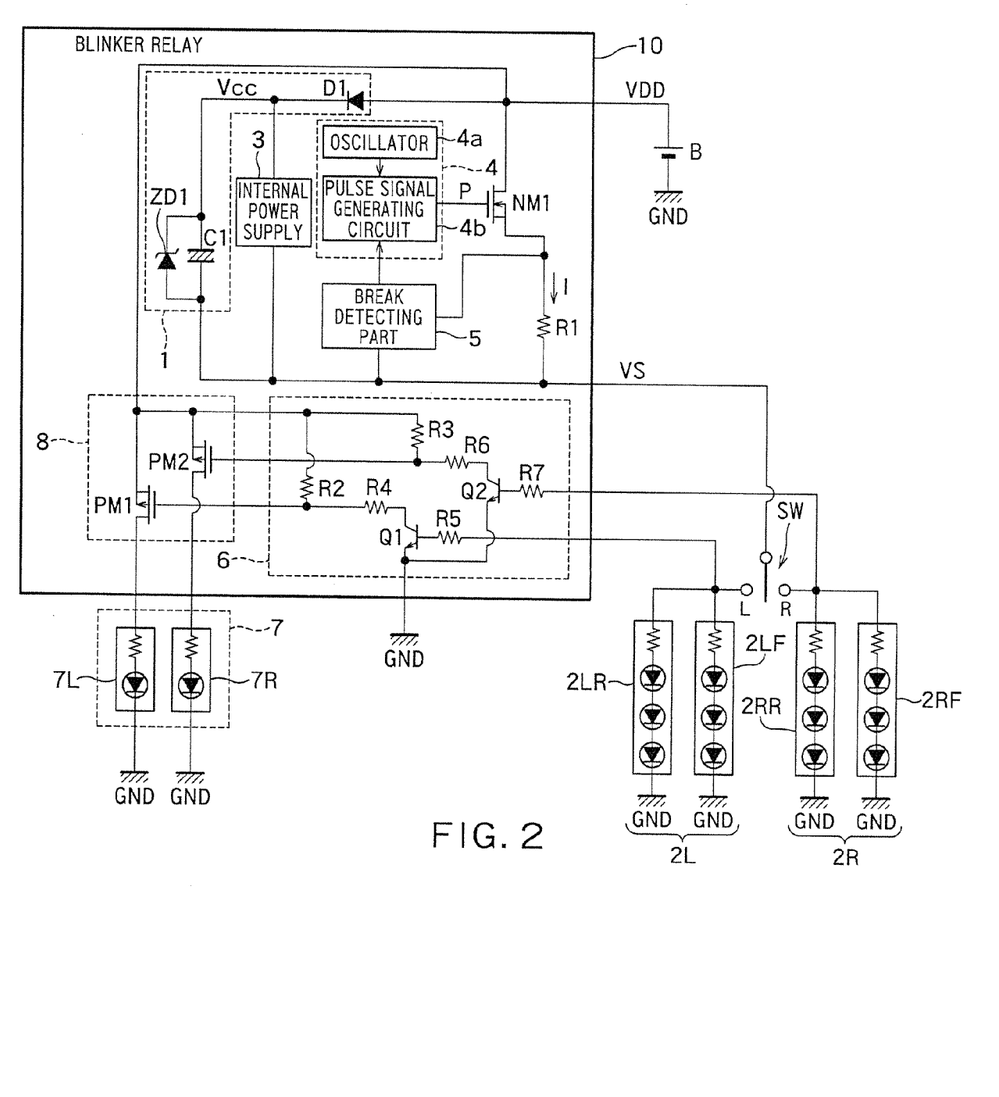
FIG. 2 is a circuit diagram showing the direction indicating apparatus according to the first embodiment, in particular, showing an example of a circuit configuration of the lighting state detecting part 6.

FIG. 2 is a circuit diagram showing the direction indicating apparatus according to the first embodiment, in particular, showing an example of a circuit configuration of the lighting state detecting part 6. The circuit components other than those of the lighting state detecting part 6 are the same as those shown in FIG. 1 and will not be further described.

As shown in FIG. 2, the lighting state detecting part 6 has a first resistor "R2", a second resistor "R3", resistors "R4" to "R7", an NPN-type transistor (a fourth switching element) "Q1", and an NPN-type transistor (a fifth switching element) "Q2".

The first resistor "R2" receives the power supply voltage "VDD" at one end thereof and is connected to a gate of the first P-type MOS transistor "PM 1" at another end thereof.

The second resistor "R3" receives the power supply voltage "VDD" at one end thereof and is connected to a gate of the second P-type MOS transistor "PM2" at another end thereof.

The NPN-type transistor "Q1" has a collector (one end) connected to the another end of the first resistor "R2" via the resistor "R4", a base (a control terminal) connected to the one end of the first direction indicating lamp unit "2L" via the resistor "R5", and an emitter (another end) connected to the ground "GND". The NPN-type transistor "Q1" is turned on when the voltage at the one end of the first direction indicating lamp unit "2L" is equal to or higher than the first threshold voltage and is turned off when the voltage is lower than the first threshold voltage.

The NPN-type transistor "Q2" has a collector (one end) connected to the another end of the second resistor "R3" via the resistor "R6", a base (a control terminal) connected to the one end of the second direction indicating lamp unit "2R" via the resistor "R7", and an emitter (another end) connected to the ground "GND". The NPN-type transistor "Q2" is turned on when the voltage at the one end of the second direction indicating lamp unit "2R" is equal to or higher than the second threshold voltage and is turned off when the voltage is lower than the second threshold voltage.

With such a configuration, for example, in the first light-up period in which the direction indicating switch "SW" is turned on to the second terminal, and the first direction indicating lamp unit "2L" lights up, the voltage at the one end of the first direction indicating lamp unit "2L" is equal to or higher than the first threshold voltage, and the NPN-type transistor "Q1" is turned on. As a result, a current flows through the first resistor "R2", and therefore, the first P-type MOS transistor "PM1" is turned on and outputs the first indicator driving current. As a result, the first indicator "7L" lights up.

On the other hand, in the first light-off period in which the first direction indicating lamp unit "2L" does not light up, the voltage at the one end of the first direction indicating lamp unit "2L" is lower than the first threshold voltage, and therefore, the NPN-type transistor "Q1" is turned off. As a result, no current flows through the first resistor "R2", and therefore, the first P-type MOS transistor "PM1" is turned off and does not output the first indicator driving current. As a result, the first indicator "7L" lights off.

As described above, the first indicator "7L" blinks in synchronization with the blinking of the first direction indicating lamp unit "2L". Similarly, the second indicator "7R" blinks in synchronization with the blinking of the second direction indicating lamp unit "2R".

If a break occurs in the first indicator "7L" or the second indicator "7R", the current path from the power supply "B" to the ground via the first P-type MOS transistor "PM1" or the second P-type MOS transistor "PM2" is cut off. As a result, the first indicator driving current or the second indicator driving current fails to flow. However, this does not affect the driving current "I". Therefore, in this event, the break detecting part 5 detects no break, and the first direction indicating lamp unit "2L" and the second direction indicating lamp unit "2R" can continue the normal blinking operation.

As described above, according to this embodiment, in addition to the N-type MOS transistor "NM1" that outputs the driving current "I" to the first direction indicating lamp unit "2L" or the second direction indicating lamp unit "2R", the indicator driving part 8 is provided that drives at least one of the two, first and second, indicators "7L" and "7R" of the indicator part 7 and makes the one indicator light up in response to the lighting states of the first and second direction indicating lamp units "2L" and "2R". As a result, the current path to the indicator part 7 is different from the path of the driving current "I" flowing to the first direction indicating lamp unit "2L" or the second direction indicating lamp unit "2R". As a result, even if a break occurs in the first indicator "7L" or the second indicator "7R", the decrease of the current flowing to the indicator part 7 does not affect the driving current "I", so that the break detecting part 5 can be prevented from detecting the break.

Therefore, any break in the first direction indicating lamp unit "2L" or the second direction indicating lamp unit "2R" can be detected with reliability by avoiding detecting a break in the first indicator "7L" or the second indicator "7R".

(Second Embodiment)

A second embodiment differs from the first embodiment in that there is one indicator.

Figure 3:
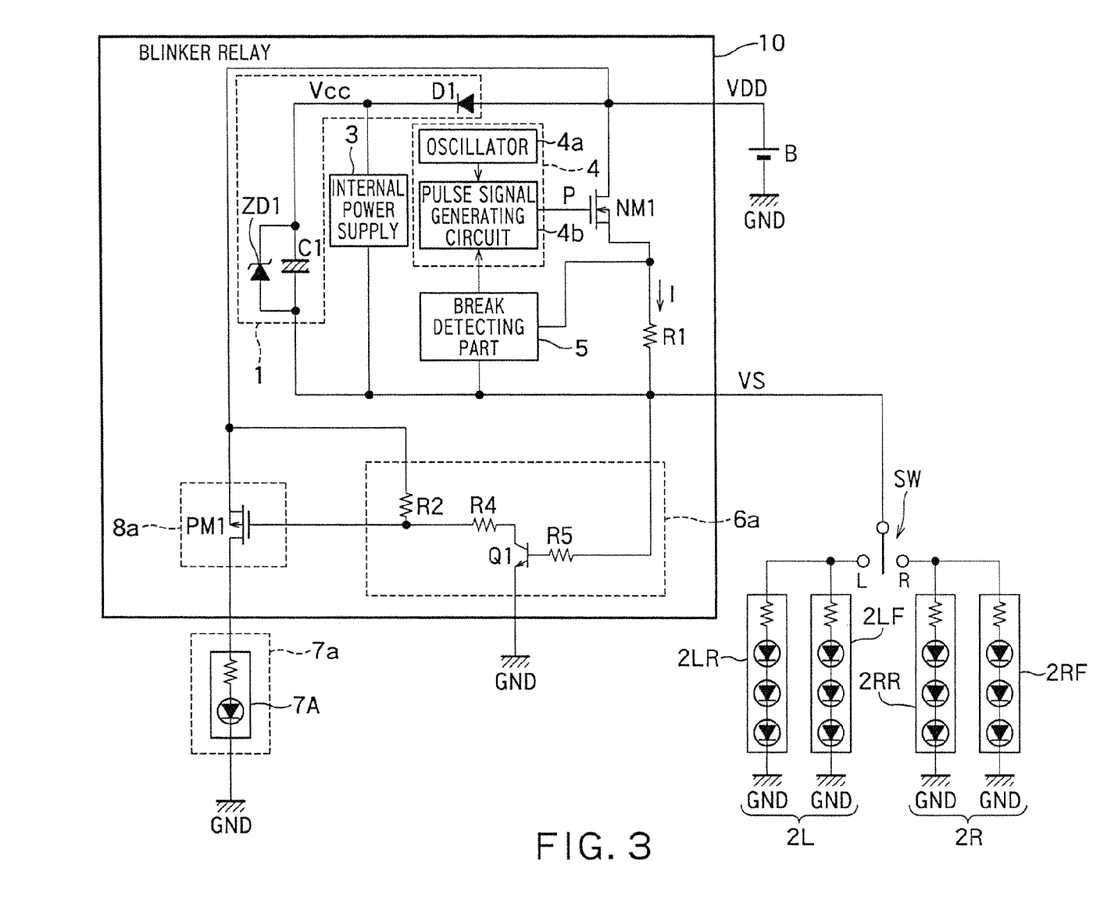
FIG. 3 is a circuit diagram showing a direction indicating apparatus according to the second embodiment.

FIG. 3 is a circuit diagram showing a direction indicating apparatus according to the second embodiment. As shown in FIG. 3, the arrangement of a lighting state detecting part "6a", an indicator part "7a" and an indicator driving part "8a" of the direction indicating apparatus differs from the arrangement of the lighting state detecting part 6, the indicator part 7 and the indicator driving part 8 according to the first embodiment. The remaining circuit components are the same as those according to the first embodiment shown in FIGS. 1 and 2, and therefore are denoted by the same reference numerals and will not be further described.

The lighting state detecting part "6a" detects that either of the first direction indicating lamp unit "2L" and the second direction indicating lamp unit "2R" lights up if the voltage at the first terminal of the direction indicating switch "SW" (that is, the reference voltage "VS") is equal to or higher than a predetermined threshold voltage. The lighting state detecting part "6a" detects that both the first direction indicating lamp unit "2L" and the second direction indicating lamp unit "2R" do not light up if the voltage at the first terminal of the direction indicating switch "SW" is lower than the threshold voltage.

According to this embodiment, the lighting state detecting part "6a" has the resistors "R2", "R4" and "R5" and the NPN-type transistor (the third switching element) "Q1".

The resistor "R2" receives the power supply voltage "VDD" at one end thereof and is connected to the gate of the P-type MOS transistor "PM1" at another end thereof.

The NPN-type transistor "Q1" has a collector (one end) connected to the another end of the resistor "R2" via the resistor "R4", a base (a control terminal) connected to the first terminal of the direction indicating switch "SW" via the resistor "R5", and an emitter (another end) connected to the ground "GND". The NPN-type transistor "Q1" is turned on when the voltage at the first terminal of the direction indicating switch "SW" is equal to or higher than the threshold voltage and is turned off when the voltage is lower than the threshold voltage.

The indicator part "7a" has one indicator "7A" that lights up when a current flows therethrough. The indicator "7A" can be provided in an instrument panel of a motorcycle. The indicator "7A" includes an LED element and a current limiting resistor connected in series with each other.

The indicator driving part "8a" drives the indicator "7A" and makes the indicator "7A" light up in response to the lighting state detected by the lighting state detecting part "6a".

Specifically, the indicator driving part "8a" drives the indicator "7A" and makes the indicator "7A" light up in a light-up period in which either of the first direction indicating lamp unit "2L" and the second direction indicating lamp unit "2R" lights up, and does not drive the indicator "7A" and does not make the indicator "7A" light up in a light-off period in which both the first direction indicating lamp unit "2L" and the second direction indicating lamp unit "2R" do not light up.

According to this embodiment, the indicator driving part "8a" has the P-type MOS transistor (the second switching element) "PM1". The P-type MOS transistor "PM1" has a source (one end) to which the power supply voltage "VDD" is supplied and a drain (another end) at which the indicator driving current is output in the light-up period and is not output in the light-off period.

The indicator "7A" is connected to the drain of the P-type MOS transistor "PM1" at one end (on an anode side) thereof and to the ground "GND" at another end (on a cathode side) thereof. That is, the indicator driving current can flow to the indicator "7A".

With such a configuration, for example, in the light-up period in which the direction indicating switch "SW" is turned on to the second terminal, and the first direction indicating lamp unit "2L" lights up, the reference voltage "VS" is equal to or higher than the threshold voltage, and the NPN-type transistor "Q1" is turned on. As a result, a current flows through the resistor "R2", and therefore, the P-type MOS transistor "PM1" is turned on and outputs the indicator driving current. As a result, the indicator "7A" lights up.

Similarly, in the light-up period in which the direction indicating switch "SW" is turned on to the third terminal, and the second direction indicating lamp unit "2R" lights up, the P-type MOS transistor "PM1" is turned on and outputs the indicator driving current. As a result, the indicator "7A" lights up.

On the other hand, in the light-off period in which the first direction indicating lamp unit "2L" and the second direction indicating lamp unit "2R" do not light up, the reference voltage "VS" is lower than the threshold voltage, and therefore, the NPN-type transistor "Q1" is turned off. As a result, no current flows through the first resistor "R2", and therefore, the P-type MOS transistor "PM1" is turned off and does not output the indicator driving current. As a result, the indicator "7A" lights off.

In this way, the indicator "7A" blinks in synchronization with the blinking of the first direction indicating lamp unit "2L" or blinks in synchronization with the blinking of the second direction indicating lamp unit "2R".

If a break occurs in the indicator "7A", the current path from the power supply "B" to the ground via the P-type MOS transistor "PM1" is cut off. As a result, the indicator driving current fails to flow. However, this does not affect the driving current "I". Therefore, in this event, the break detecting part 5 detects no break, and the first direction indicating lamp unit "2L" and the second direction indicating lamp unit "2R" can continue the normal blinking operation.

As described above, according to this embodiment, in addition to the N-type MOS transistor "NM1" that outputs the driving current "I" to the first direction indicating lamp unit "2L" or the second direction indicating lamp unit "2R", the indicator driving part "8a" is provided that drives the indicator "7A" of the indicator part "7a" and makes the indicator "7A" light up in response to the lighting states of the first and second direction indicating lamp units "2L" and "2R". As a result, the current path to the indicator part "7a" is different from the path of the driving current "I". As a result, even if a break occurs in the indicator "7A", the decrease of the current flowing to the indicator part "7a" does not affect the driving current "I", so that the break detecting part 5 can be prevented from detecting the break. That is, the same advantage as in the first embodiment can be achieved.

Although embodiments of the present invention have been described in detail, the present invention is not limited to the specific configurations according to the embodiments described above, and various modifications can be made without departing from the spirit of the present invention.

For example, the N-type MOS transistor "NM1" can be replaced with a P-type MOS transistor. In that case, the bootstrap circuit 1 can be omitted.

As an alternative, the first and second indicators "7L" and "7R" and the indicator "7A" can be composed of an electric bulb.

The number of LED elements in each of the front left direction indicating lamp "2LF", the rear left direction indicating lamp "2LR", the front right direction indicating lamp "2RF" and the rear right direction indicating lamp "2RR" is not limited to three. Similarly, the number of LED elements in each of the first and second indicators "7L" and "7R" and the indicator "7A" is not limited to one.

Furthermore, the direction indicating apparatus can be provided with a hazard switch. The hazard switch can switch between an on state where the first terminal, the second terminal and the third terminal of the direction indicating switch "SW" are electrically connected to each other and an off state where the first terminal, the second terminal and the third terminal are electrically disconnected from each other. If the hazard switch is provided, when the hazard switch is in the on state, the first and second direction indicating lamp units "2L" and "2R" blink at the same time. In that event, according to the first embodiment, the first and second indicators "7L" and "7R" blink at the same time in synchronization with the blinking of the first and second direction indicating lamp units "2L" and "2R". According to the second embodiment, the indicator "7A" blinks in synchronization with the blinking of the first and second direction indicating lamp units "2L" and "2R".

EXPLANATION OF REFERENCES 1 bootstrap circuit
SW direction indicating switch
2L first direction indicating lamp unit
2R second direction indicating lamp unit
3 internal power supply
4 pulse signal generating part
4a oscillator
4b pulse signal generating circuit
5 break detecting part
6, 6a lighting state detecting part
7, 7a indicator part
7L first indicator
7R second indicator
7A indicator
8, 8a indicator driving part
R1 current detecting resistor R2 first resistor
R3 second resistor
R4 to R7 resistor
D1 diode
C1 capacitive element
NM1 N-type MOS transistor (first switching element)
PM1 first P-type MOS transistor (second switching element)
PM2 second P-type MOS transistor (third switching element)
Q1 NPN-type transistor (third or fourth switching element)
Q2 NPN-type transistor (fifth switching element)

The invention claimed is:

1. A direction indicating apparatus, comprising:
a pulse signal generating part that generates a pulse signal;
a first switching element having a first end to which a power supply voltage is supplied, a control terminal to which the pulse signal is supplied and a second end at which a driving current having a magnitude corresponding to an amplitude of the pulse signal is output;
a direction indicating switch that has a first terminal, a second terminal and a third terminal and is capable of switching among a state where the first terminal and the second terminal are electrically connected to each other, a state where the first terminal and the third terminal are electrically connected to each other and a state where the first terminal, the second terminal and the third terminal are electrically disconnected from each other, the first terminal being connected to the second end of the first switching element;
a first direction indicating lamp unit that includes a first LED element, is connected to the second terminal at a first end thereof and to a ground at a second end thereof, and lights up when a current flows therethrough;
a second direction indicating lamp unit that includes a second LED element, is connected to the third terminal at a first end thereof and to the ground at a second end thereof, and lights up when a current flows therethrough;
a break detecting part that makes the pulse signal generating part change a period of the pulse signal when the driving current corresponding to a pulse wave of the pulse signal is equal to or lower than a predetermined break detection value;
a lighting state detecting part that detects a lighting state of the first direction indicating lamp unit and the second direction indicating lamp unit;
an indicator part having one or a plurality of indicators that light up when a current flows therethrough; and
an indicator driving part that drives the one indicator and makes the one indicator light up in response to the lighting state detected by the lighting state detecting part or drives at least any of the plurality of indicators and makes the indicator light up in response to the lighting state;
wherein the indicator part has a first indicator and a second indicator; and
the indicator driving part drives the first indicator and makes the first indicator light up in a first light-up period in which the first direction indicating lamp unit lights up and does not drive the first indicator and does not make the first indicator light up in a first light-off period in which the first direction indicating lamp unit does not light up, and the indicator driving part drives the second indicator and makes the second indicator light up in a second light-up period in which the second direction indicating lamp unit lights up and does not drive the second indicator and does not make the second indicator light up in a second light-off period in which the second direction indicating lamp unit does not light up; and
wherein the lighting state detecting part detects that the first direction indicating lamp unit lights up if a voltage at the first end of the first direction indicating lamp unit is equal to or higher than a predetermined first threshold voltage and detects that the first direction indicating lamp unit does not light up if the voltage at the first end of the first direction indicating lamp unit is lower than the first threshold voltage, and the lighting state detecting part detects that the second direction indicating lamp unit lights up if a voltage at the first end of the second direction indicating lamp unit is equal to or higher than a predetermined second threshold voltage and detects that the second direction indicating lamp unit does not light up if the voltage at the first end of the second direction indicating lamp unit is lower than the second threshold voltage.

2. The direction indicating apparatus according to claim 1, wherein the indicator driving part has:
a second switching element having a first end to which the power supply voltage is supplied and a second end at which a first indicator driving current is output in the first light-up period and is not output in the first light-off period; and
a third switching element having a first end to which the power supply voltage is supplied and a second end at which a second indicator driving current is output in the second light-up period and is not output in the second light-off period,
the first indicator is connected to the second end of the second switching element at a first end thereof and to the ground at a second end thereof, and
the second indicator is connected to the second end of the third switching element at a first end thereof and to the ground at a second end thereof.

3. The direction indicating apparatus according to claim 2, wherein the second switching element is formed by a first P-type MOS transistor having a source to which the power supply voltage is supplied and a drain connected to the first end of the first indicator,
the third switching element is formed by a second P-type MOS transistor having a source to which the power supply voltage is supplied and a drain connected to the first end of the second indicator, and
the lighting state detecting part has:
a first resistor that receives the power supply voltage at a first end thereof and is connected to a gate of the first P-type MOS transistor at a second end thereof;
a second resistor that receives the power supply voltage at a first end thereof and is connected to a gate of the second P-type MOS transistor at a second end thereof;
a fourth switching element that has a first end connected to the second end of the first resistor, a control terminal connected to the first end of the first direction indicating lamp unit and a second end connected to the ground and is turned on when the voltage at the first end of the first direction indicating lamp unit is equal to or higher than the first threshold voltage; and
a fifth switching element that has a first end connected to the second end of the second resistor, a control terminal connected to the first end of the second direction indicating lamp unit and a second end connected to the ground and is turned on when the voltage at the first end of the second direction indicating lamp unit is equal to or higher than the second threshold voltage.

4. The direction indicating apparatus according to claim 1, wherein the indicator part has the one indicator, and the indicator driving part drives the one indicator and makes the one indicator light up in a light-up period in which either of the first direction indicating lamp unit and the second direction indicating lamp unit lights up, and does not drive the one indicator and does not make the one indicator light up in a light-off period in which both the first direction indicating lamp unit and the second direction indicating lamp unit do not light up.

5. The direction indicating apparatus according to claim 4, wherein the lighting state detecting part detects that either of the first direction indicating lamp unit and the second direction indicating lamp unit lights up if a voltage at the first terminal of the first direction indicating switch is equal to or higher than a predetermined threshold voltage and detects that both the first direction indicating lamp unit and the second direction indicating lamp unit do not light up if the voltage at the first terminal of the direction indicating switch is lower than the threshold voltage.

6. The direction indicating apparatus according to claim 5, wherein the indicator driving part has a second switching element having a first end to which the power supply voltage is supplied and a second end at which an indicator driving current is output in the light-up period and is not output in the light-off period, and the one indicator is connected to the second end of the second switching element at one end thereof and to the ground at a second end thereof.

7. The direction indicating apparatus according to claim 6, wherein the second switching element is formed by a P-type MOS transistor having a source to which the power supply voltage is supplied and a drain connected to the first end of the one indicator, and the lighting state detecting part has:
a resistor that receives the power supply voltage at a first end thereof and is connected to a gate of the P-type MOS transistor at a second end thereof; and
a third switching element that has a first end connected to the second end of the resistor, a control terminal connected to the first terminal of the direction indicating switch and a second end connected to the ground and is turned on when the voltage at the first terminal of the direction indicating switch is equal to or higher than the threshold voltage.

\* \* \* \* \*